April 21, 1964 R. J. LAUX 3,129,949
BALANCED SHAFT SEAL
Filed Nov. 22, 1961
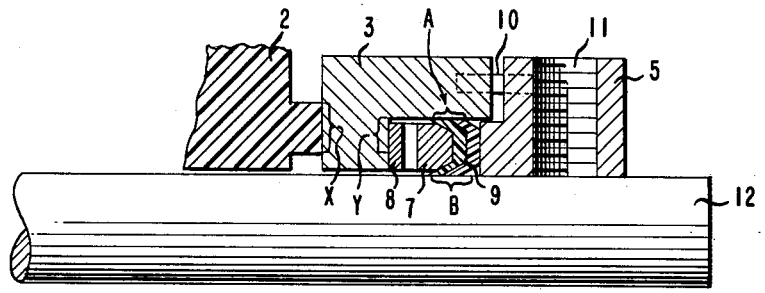
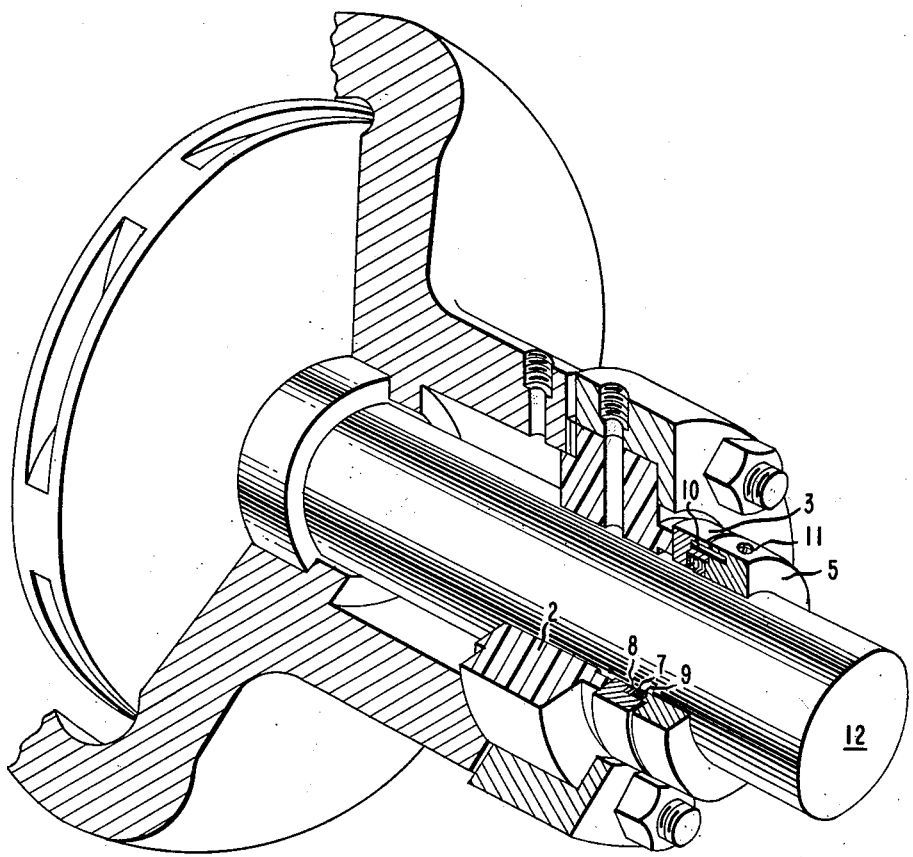
INVENTOR
ROY JOHN LAUX
BY *Harry E. Braddock*
ATTORNEY United States Patent Office 3,129,949
Patented Apr. 21, 1964

3,129,949
BALANCED SHAFT SEAL
Roy John Laux, Newark, Del., assignor to E. I. du Pont de Nemours and Company, Wilmington, Del., a corporation of Delaware
Filed Nov. 22, 1961, Ser. No. 154,156
5 Claims. (Cl. 277—27)

This invention relates generally to shaft seals and to the provision of improved means for sealing rotating shafts to prevent the escape of fluids along the shaft past a wall or casing in which the shaft extends. More specifically, this invention involves an improved sealing arrangement ideally adapted for handling elevated temperature, high pressure liquids of a corrosive or dangerous nature.

In many conventional sealing arrangements, the primary sealing function is accomplished by the axial opposing engagement of a rotating annular radial surface carried by a rotating shaft and perpendicular to the shaft axis, with a stationary annular radial surface carried by a wall. In many such arrangements the surfaces are urged together by appropriately applied presures of the liquid being pumped by an impeller on the shaft, or of a liquid supplied from an independent pressure source. Usually this liquid pressure is supplemented by the action of some resilient means, such as a spring, operatively associated with the shaft and radial surfaces.

One difficulty encountered with these conventional sealing arrangements has been that, as they were used to handle liquids at extremely high pressures and temperatures, the film of liquid which ordinarily exists between the radial sealing surfaces becomes so overheated due to the high shear and friction conditions between the opposed radial faces, that portions of the liquid film vaporize to destroy the seal action and actually may blow the seal faces apart. This phenomena occurs as an oscillatory chattering action with accompanying leakage which is undesirable and cannot be tolerated especially when toxic or corrosive liquids are involved.

It is one object of my invention to provide an improved sealing arrangement which overcomes the above problem of seal failure at elevated pressures and temperatures.

It is another object of this invention to provide an improved sealing arrangement of very simple construction yet highly reliable and efficient in operation at all temperatures and pressures within the limits of the packing material utilized in the particular seal.

The objects of the invention are achieved by the sealing arrangement of this invention in which the radial sealing surfaces, although exposed to the liquid under pressure, are isolated from any significant action of the liquid under pressure tending to urge the surfaces further into engagement with each other, and the sealing surfaces are provided with an independent means tending to urge them together at a substantially constant force regardless of the pressure or temperature of the liquid being handled and in contact with the radial sealing surfaces, the force being controlled at a predetermined level to prevent the overheating of the liquid film as described above.

Other objects and advantages will appear from a consideration of the following specification and claims when taken in conjunction with the accompanying drawings in which:

FIGURE 1 is a partial longitudinal view of a shaft seal arrangement embodying features of this invention. Certain of the seal parts are shown in longitudinal cross section to more clearly illustrate the cooperation of the parts.

FIGURE 2 is a perspective view of the shaft seal arrangement of my invention applied to a specific pump construction. In this view certain parts are shown in sections and broken away for clearer illustration.

Referring to the drawings, it will be seen that element 2 is an annular unit secured to stationary structures such as the pump casing or housing shown. Element 2 surrounds a rotary shaft 12, and is provided with an accurately finished radial seal, or bearing, surface indicated at X lying in a plane substantially perpendicular to the axis of the shaft. Element 2 is preferably formed of material such as carbon. A collar element 5 is fixedly secured to shaft 12 by suitable means such as one or more set screws 11. An axially slidable bushing 3 is positioned on the shaft between the element 2 and the collar element 5. Bushing 3 is provided with a portion of increased inside diameter at the end adjacent the collar element 5. In this portion are positioned packing rings 9 of a suitable material resistant to high pressure, high temperature corrosive liquids. Preferably such rings are formed of a solid material such as poly(tetrafluoroethylene) or related materials.

A spring means 8, which preferably may be in the form of a "wave washer" and a packing ring follower 7 act between the bushing end 3 and the packing rings to force the same against collar element 5 and into sealing relationship with the shaft 12 and the interior of the enlarged portion of bushing 3. It will be noted that a clearance or passageway exists between the exterior of the shaft 12 and the elements 2 and 3 to allow entry of the pressure liquid. The bushing 3 is free to move axially a limited distance to accommodate shaft end play, but is connected to collar element 5 by axially aligned pins 10 to rotate therewith.

Bushing 3 abuts radial face X of element 2 with its radial face or end portion which is accurately finished and substantially perpendicular to the shaft axis to form with the mating surface of element 2 an effective seal for a pressure liquid contained between the shaft and the elements 2 and 3. Movement of liquid along the shaft between the shaft and element 3 is prevented by packing rings 9. Spring 8 acts to maintain elements 2 and 3 in engagement with each other and also to maintain the packing rings in operative association with the shaft 12, bushing element 3, and collar element 5. It is believed that the operation of the device will be clear from this discussion of its parts and the cooperation between its parts. Any shaft end play will be accommodated by relative movement between bushing element 3 and the packing rings 9. Any abrasion or wear caused by axial relative movement of the parts due to shaft end play, will occur at the area indicated at "A" on replaceable bushing 3 as seen in FIGURE 1 and avoid scoring of the shaft itself at "B." (This obviously is highly desirable as packing rings of certain materials are somewhat abrasive in nature.)

In order to provide a balanced relationship in which the force caused by liquid pressure on bushing element 3 tending to compress the spring 8 is substantially equal to the force caused by liquid pressure on bushing element 3 tending to force it against element 2, the effective area X of element 3 acted upon by the liquid pressure tending to compress spring 8 is substantially equal to twice the effective area Y of element 3 acted upon by liquid pressure urging element 3 against element 2. This ratio of areas is determined by the fact that the pressure of the liquid across bearing face X varies from a maximum at the inner edge of the face to a minimum of zero at the outer edge of the face, giving an approximate average pressure of one half the maximum pressure at the inner edge, whereas the pressure on area Y opposing the pressure on face X is undiminished at an average pressure equal to the maximum pressure. Accordingly, in order to balance the forces due to liquid pressure at any pressure the face X must be substantially twice as large in area as face Y. The bearing faces engage with a pressure determined solely by spring 8 and substantially completely independently of the pressure existing between the shaft and the surrounding elements. The spring pressure is governed mainly by the maximum temperature of the liquid medium, the radial distance of the face X from the shaft axis, and the rotational speed of the shaft and associated parts. The spring pressure is selected such that for these conditions, sufficient seal contact pressure is maintained without exceeding a pressure level which would cause overheating, vaporization, and disruption of the liquid film between the bearing faces.

For one particular example of a seal embodying principles of this invention for a bearing face area of 1.92 square inches at an average radial distance of 1.225 inches from the shaft axis, and for a rotational speed of 3550 r.p.m. a pressure of 24 p.s.i. is needed on the sealing faces. This satisfactorily handles liquids at temperatures from 30° F. to 475° F. and up to pressures of 250 lbs. p.s.i.

It is believed clear that I have provided a simple and effective sealing arrangement which functions in an improved manner to overcome the operating deficiencies of the prior art sealing arrangements.

It is believed that the invention and its advantages will be fully understood from the foregoing description. Many changes and departures from the disclosed version of the device will be apparent to those skilled in the art without departing from the spirit of the invention and such are considered to fall within the scope of the following claims:

I claim:

1. An improved seal arrangement for preventing escape of hot, high pressure liquids of varying temperatures and varying pressures along a rotating shaft, past a stationary wall structure, said arrangement comprising, in combination: a stationary annular bearing element having an annular sealing surface and adapted to be secured to a stationary wall structure and further adapted to surround a rotating shaft, an elongated rotatable bushing element having an annular sealing surface and adapted to surround a rotating shaft and positioned in axial alignment and having its sealing surface in abutment with the sealing surface of said annular bearing element, a rotatable collar element in axial alignment with and spaced a limited distance from the other end of said bushing element and adapted to surround and be fixedly attached to a rotating shaft, said bushing element operatively linked to said collar element for rotary movement therewith and for axial movement with respect thereto, a liquid sealing means positioned between said bushing element and said collar element, a resilient means positioned between bushing element and said sealing means to urge said bushing element against said stationary element with a predetermined force and said sealing means into engagement with said bushing element and said collar element, said bushing element provided with a pressure surface opposed to its annular sealing surface and constructed and arranged to be in communication with its annular sealing surface, said annular sealing surface having about twice the effective area as the opposed pressure surface to balance the forces of a high pressure liquid of varying temperature and pressure which is contained within said seal arrangement and maintain the force substantially constant at its predetermined level.

2. An improved high temperature and pressure liquid sealing assembly, said assembly comprising in combination a housing structure, a shaft extending through said housing structure and adapted for relative rotation with respect thereto, an annular bearing element secured to said housing structure and having a radially extending annular sealing surface aligned with and surrounding said shaft, a collar element fixed to said shaft and spaced axially from the sealing surface of said annular bearing element, an elongated bushing aligned with, surrounding and axially slidably mounted for limited axial movement on said shaft between said annular bearing element and said collar element, said bushing having one end provided with a radially extending annular sealing surface in aligned opposed mating alignment with said sealing surface of said annular bearing element, and the other end thereof operatively connected to said collar element for rotation therewith, an annular liquid sealing means cooperating with said shaft, said collar element and said other end of said bushing, a resilient means acting between said bushing and said collar element to urge said bushing sealing surface into engagement with the sealing surface of said annular bearing, liquid passageway means for connecting said annular sealing surfaces to a source of pressure liquid, said bushing provided with a radially extending liquid pressure surface axially opposed to the annular sealing surface of said bushing and in communication with said passageway means, the effective areas of said pressure surface and said annular sealing surface being such that the resultant axial force exerted on said bushing by a liquid at any pressure in said passageway means is substantially zero and the force urging the bushing against said annular bearing element is substantially entirely that of said resilient means and constant below a level at which a film of liquid between said sealing surfaces would become disrupted due to frictional over heating.

3. The improved assembly of claim 2 in which the ratio of the area of said annular sealing surface to the area of said liquid pressure surface is about two to one.

4. An improved seal arrangement for preventing escape of a hot, high pressure liquid of varying temperatures from about 30° F. to about 475° F. and varying pressures of up to about 600 p.s.i., along a rotating shaft, past a stationary wall structure, said arrangement comprising, in combination: a stationary annular bearing element having an annular sealing surface and adapted to be secured to a stationary wall structure and further adapted to surround a rotating shaft, an elongated rotatable bushing element having an annular sealing surface and adapted to surround a rotating shaft and positioned in axial alignment and having its sealing surface in abutment with the sealing surface of said annular bearing element, a rotatable collar element in axial alignment with and spaced a limited distance from the other end of said bushing element and adapted to surround and be fixedly attached to a rotating shaft, said bushing element operatively linked to said collar element for rotary movement therewith and for axial movement with respect thereto, a liquid sealing means positioned between said bushing element and said collar element, a resilient means positioned between said bushing element and said sealing means to urge said bushing element against said stationary element with a predetermined force and said sealing means into engagement with said bushing element and said collar element, said bushing element provided with a pressure surface opposed to its annular sealing surface and constructed and arranged to be in communication with its annular sealing surface, said annular sealing surface having about twice the effective area as the opposed pressure surface to balance the forces of a high pressure liquid of varying temperature and pressure which is contained within said seal arrangement and maintain the force substantially constant at its predetermined level, said resilient means having characteristics such that, relative to (1) the maximum temperature of the liquid medium, (2) the average radial distance of the annular sealing surface of said bushing from the axis of said rotating shaft, and (3) the rotational speed of the shaft and bushing, the bushing is maintained in constant pressure contact with said stationary bearing element without overheating or vaporization of a film of said liquid existing between the sealing surfaces.

5. The improved assembly of claim 4 in which the ratio of the area of said annular sealing surface to the area of said liquid pressure surface is about two to one and said sealing means comprising at least one sealing ring of a fluorinated hydrocarbon material engaged between said shaft and said bushing element.

References Cited in the file of this patent

UNITED STATES PATENTS

| | | |
|---|---|---|
| 1,926,007 | Kohler | Sept. 5, 1933 |
| 2,964,340 | Kinzie et al. | Dec. 13, 1960 |

FOREIGN PATENTS

| | | |
|---|---|---|
| 593,842 | Canada | Mar. 8, 1960 |